US012600354B2

(12) United States Patent
Borhan et al.

(10) Patent No.: US 12,600,354 B2
(45) Date of Patent: Apr. 14, 2026

(54) SYSTEMS AND METHODS FOR GEAR SHIFTING MANAGEMENT IN COOPERATIVE ADAPTIVE CRUISE CONTROL

(71) Applicant: CUMMINS INC., Columbus, IN (US)

(72) Inventors: Hoseinali Borhan, Bloomington, IN (US); Timothy R. Frazier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/840,870

(22) PCT Filed: Dec. 23, 2022

(86) PCT No.: PCT/US2022/053964
§ 371 (c)(1),
(2) Date: Aug. 22, 2024

(87) PCT Pub. No.: WO2023/163789
PCT Pub. Date: Aug. 31, 2023

(65) Prior Publication Data
US 2025/0162580 A1 May 22, 2025

Related U.S. Application Data

(60) Provisional application No. 63/313,503, filed on Feb. 24, 2022.

(51) Int. Cl.
*B60W 30/14* (2006.01)
*B60W 10/06* (2006.01)
(Continued)

(52) U.S. Cl.
CPC ............ *B60W 30/14* (2013.01); *B60W 10/06* (2013.01); *B60W 10/10* (2013.01);
(Continued)

(58) Field of Classification Search
CPC ...... B60W 10/06; B60W 10/10; B60W 30/14; B60W 30/18154; B60W 50/0097; B60W 50/06; B60W 2556/45; G08G 1/22
See application file for complete search history.

(56) References Cited

U.S. PATENT DOCUMENTS

| | | |
|---|---|---|
| 8,332,108 B2 | 12/2012 | Kresse et al. |
| 9,297,455 B2 | 3/2016 | Li |

(Continued)

FOREIGN PATENT DOCUMENTS

| | | | | |
|---|---|---|---|---|
| CN | 112154386 A | * | 12/2020 | ............. G06V 20/58 |
| JP | 2015020501 A | * | 2/2015 | |

(Continued)

OTHER PUBLICATIONS

International Search Report and Written Opinion on PCT PCT/US2022/053964 Dtd Mar. 31, 2023.

*Primary Examiner* — Edwin A Young
(74) *Attorney, Agent, or Firm* — Foley & Lardner LLP

(57) ABSTRACT

Systems and methods for transmission gear shift management of a vehicle having cooperative adaptive cruise control (CACC) are provided. A method includes: enabling a cooperative adaptive cruise control (CACC) mode of a vehicle; updating a transmission shift map to adjust at least one threshold associated with a transmission shift event in response to enabling the CACC mode of the vehicle; receiving a torque demand from the vehicle in response to enabling the CACC mode of the vehicle; determining a transmission shift event based on the received torque demand and the updated transmission shift map; and implementing the determined transmission shift event.

20 Claims, 5 Drawing Sheets

(51) Int. Cl.

| | |
|---|---|
| *B60W 10/10* | (2012.01) |
| *B60W 30/18* | (2012.01) |
| *B60W 50/00* | (2006.01) |
| *B60W 50/06* | (2006.01) |
| *G08G 1/00* | (2006.01) |

(52) U.S. Cl.
CPC .. *B60W 30/18154* (2013.01); *B60W 50/0097* (2013.01); *B60W 50/06* (2013.01); *G08G 1/22* (2013.01); *B60W 2556/45* (2020.02)

(56) References Cited

U.S. PATENT DOCUMENTS

| | | | |
|---|---|---|---|
| 10,029,693 | B2 | 7/2018 | Sujan et al. |
| 10,073,464 | B2 | 9/2018 | Pilkington |
| 10,576,964 | B2 | 3/2020 | Kumazaki et al. |
| 2018/0135744 | A1 | 5/2018 | Kuang et al. |
| 2019/0025857 | A1 | 1/2019 | Luckevich et al. |
| 2019/0154143 | A1 | 5/2019 | Ganske et al. |
| 2019/0163205 | A1 | 5/2019 | Kodera et al. |
| 2019/0338849 | A1 | 11/2019 | Chunodkar et al. |
| 2020/0001910 | A1 | 1/2020 | Chow |
| 2021/0163004 | A1 | 6/2021 | Wiberg et al. |
| 2021/0213948 | A1 | 7/2021 | Lahti et al. |
| 2021/0264794 | A1 | 8/2021 | Merwaday et al. |

FOREIGN PATENT DOCUMENTS

| | | | | |
|---|---|---|---|---|
| JP | 2016115356 A | * | 6/2016 | ........... B60K 28/066 |
| WO | WO-2019094843 A1 | * | 5/2019 | ......... G06F 15/7807 |
| WO | WO-2019/118833 A1 | | 6/2019 | |

* cited by examiner

300

305

Enable a CACC operation mode of a vehicle

310

Update a transmission map for the vehicle based on the CACC operation mode being enabled

315

Receive a torque demand during the CACC operation mode of a vehicle.

320

Determine a transmission shift event based on the received torque demand and the updated transmission map

325

Implement the determined transmission shift event

Figure 4:
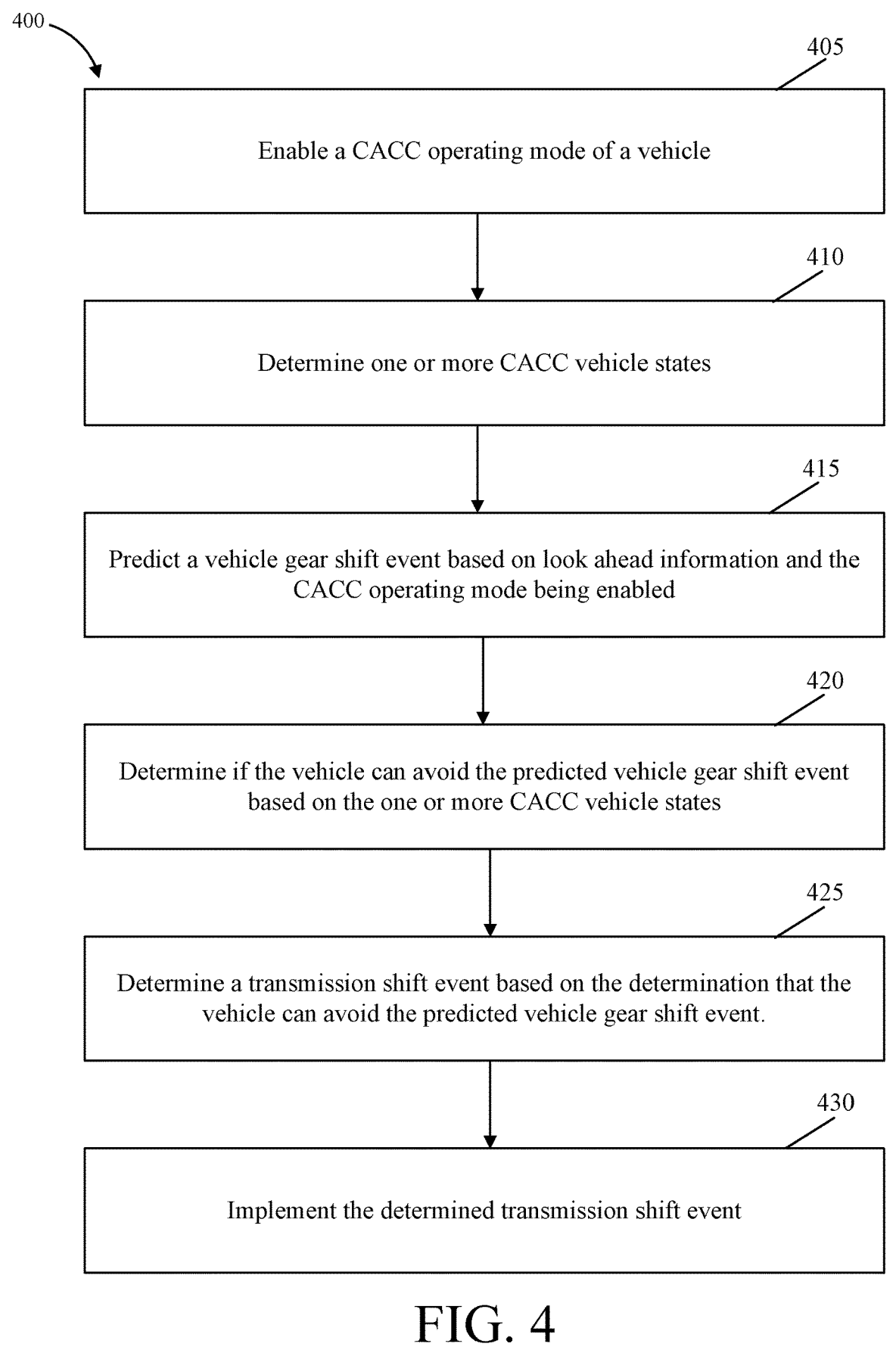

400

405

Enable a CACC operating mode of a vehicle

410

Determine one or more CACC vehicle states

415

Predict a vehicle gear shift event based on look ahead information and the CACC operating mode being enabled

420

Determine if the vehicle can avoid the predicted vehicle gear shift event based on the one or more CACC vehicle states

425

Determine a transmission shift event based on the determination that the vehicle can avoid the predicted vehicle gear shift event.

430

Implement the determined transmission shift event

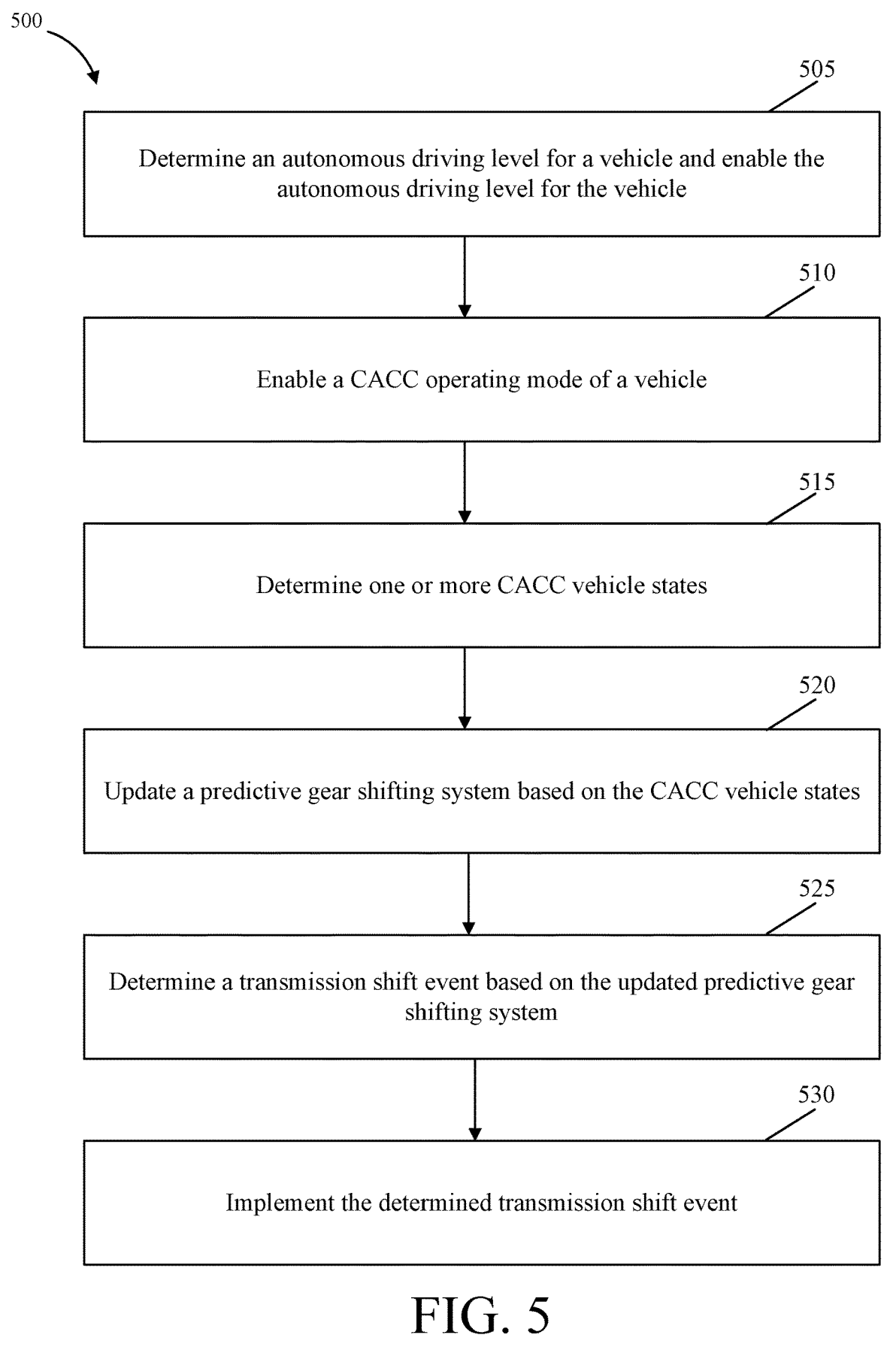

Determine an autonomous driving level for a vehicle and enable the autonomous driving level for the vehicle

510

Enable a CACC operating mode of a vehicle

515

Determine one or more CACC vehicle states

520

Update a predictive gear shifting system based on the CACC vehicle states

525

Determine a transmission shift event based on the updated predictive gear shifting system

530

Implement the determined transmission shift event

FIG. 5

SYSTEMS AND METHODS FOR GEAR SHIFTING MANAGEMENT IN COOPERATIVE ADAPTIVE CRUISE CONTROL

CROSS-REFERENCE TO RELATED APPLICATIONS

This application is a U.S. National Stage Application of International Application No. PCT/US2022/053964, filed Dec. 23, 2022, which claims the benefit of and priority to U.S. Provisional Patent Application No. 63/313,503, filed Feb. 24, 2022, both of which are incorporated herein by reference in their entireties and for all purposes.

STATEMENT REGARDING FEDERALLY SPONSORED RESEARCH OR DEVELOPMENT

This invention was made with Government support under contract DE-EE0008469 awarded by DOE. The Government has certain rights in this invention

TECHNICAL FIELD

The present application relates to systems and methods for improving gear shifting management to improve vehicle performance, such as fuel economy, for vehicles utilizing autonomous driving systems with cooperative adaptive cruise control.

BACKGROUND

Cooperative adaptive cruise control (CACC) may be used in a variety situations, such as a platoon environment. A platoon may be defined as a group of vehicles travelling together to create benefits via group sensing of environmental conditions (e.g., road conditions, road grade, upcoming curves, etc. and dynamic information, such as upcoming weather, traffic, etc. information).

CACC is a type of adaptive cruise control. Within an adaptive cruise control system, a first vehicle aims to maintain a certain following distance behind a second vehicle. A CACC system improves upon the adaptive cruise control system by enabling vehicle-to-vehicle (V2V) communication. This allows the first vehicle and the second vehicle to communicate and therefore "cooperate" leading to more stable and closer following distances between the first vehicle and the second vehicle.

SUMMARY

One embodiment relates to a method. The method includes: enabling a cooperative adaptive cruise control (CACC) mode of a vehicle, updating a transmission shift map to adjust at least one threshold associated with a transmission shift event in response to enabling the CACC mode of the vehicle, receiving a torque demand from the vehicle in response to enabling the CACC mode of the vehicle, determining a transmission shift event based on the received torque demand and the updated transmission shift map, and implementing the determined transmission shift event. The vehicle may be one vehicle in a platoon of vehicles comprising a plurality of vehicles utilizing CACC. The platoon of vehicles may include comprise a lead vehicle configured to provide route information to one or more trail vehicles within the platoon of vehicles. The updated transmission shift map may increase at least one engine speed threshold for at least one transmission setting such that the updated transmission shift map has less gear shift sensitivity at higher gears. In one embodiment, implementing the determined transmission shift event includes bypassing the determined transmission shift to maintain a current transmission setting.

Another embodiment relates to a method. The method includes: enabling a cooperative adaptive cruise control (CACC) mode of a vehicle, determining one or more CACC vehicle states, predicting a vehicle gear down shift event based on look ahead information in response to enabling the CACC mode of the vehicle, determining that the vehicle can avoid the predicted vehicle gear down shift event based on the one or more CACC vehicle states, determining a transmission shift event based on the determination that the vehicle can avoid the predicted vehicle gear down shift event, and implementing the determined transmission shift event Still another embodiment relates to a system. The system includes a controller coupled to a powertrain of a vehicle, the powertrain including at least one of an engine and a transmission. The controller is structured to: enabling a cooperative adaptive cruise control (CACC) mode of a vehicle, updating a transmission shift map to adjust at least one threshold associated with a transmission shift event in response to enabling the CACC mode of the vehicle, receiving a torque demand from the vehicle in response to enabling the CACC mode of the vehicle, determining a transmission shift event based on the received torque demand and the updated transmission shift map, and implementing the determined transmission shift event.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIG. 4 is a flow diagram of another method of implementing a gear shifting control strategy with the vehicle 100 of FIG. 1, according to an exemplary embodiment.

FIG. 5 is a flow diagram of another method of implementing a gear shifting control strategy with the vehicle 100 of FIG. 1, according to an exemplary embodiment.

DETAILED DESCRIPTION

Figure 1:
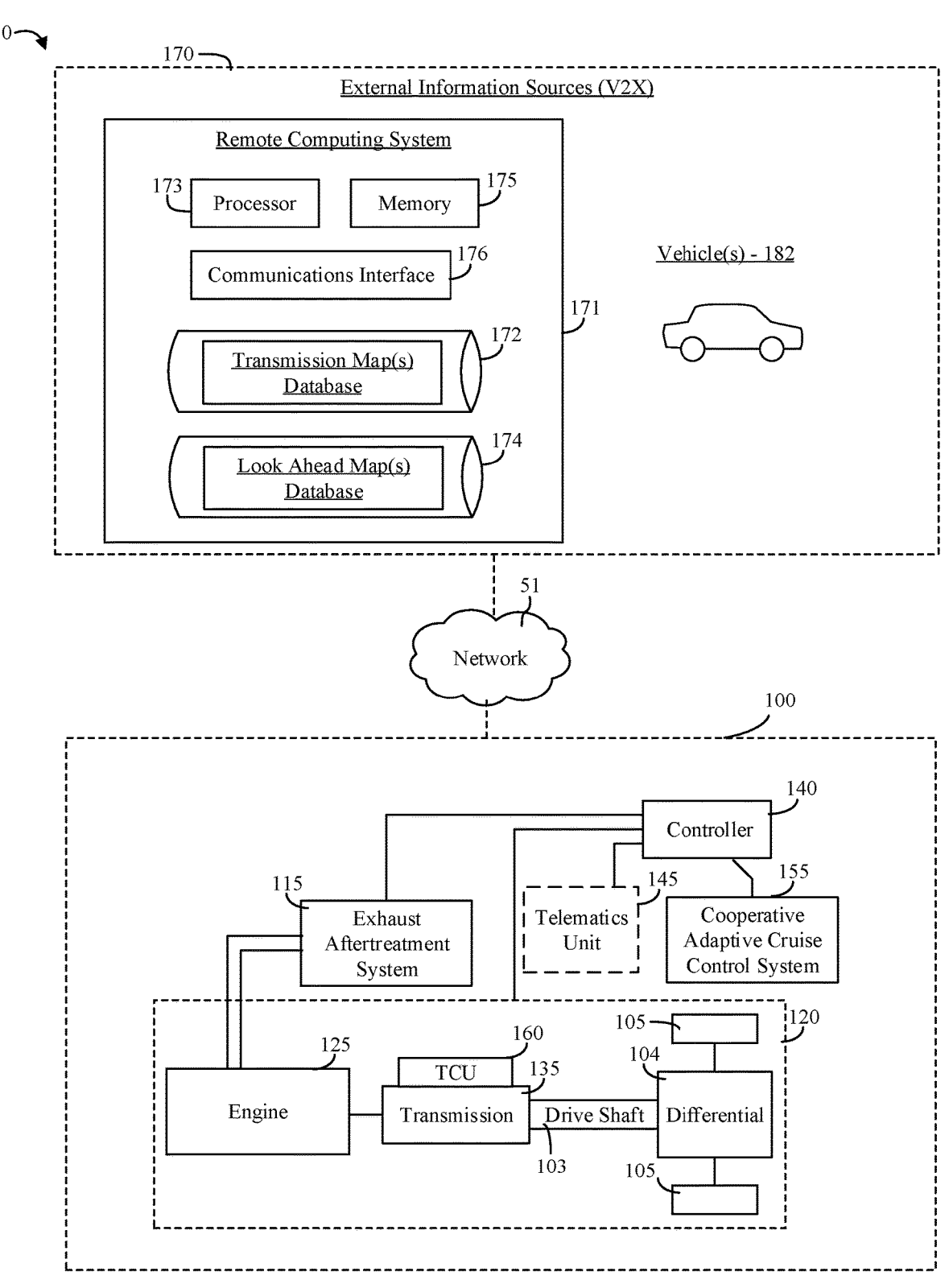
FIG. 1 is a schematic diagram of a vehicle having a gear shifting management system in a networked or intelligent transportation system, according to an example embodiment.

Following below are more detailed descriptions of various concepts related to, and implementations of, systems and methods for transmission gear shift management of a vehicle having CACC enabled to achieve various objectives for the vehicle and/or a fleet which the vehicle is a part of, such as improved fuel economy, a reduction in emissions, improved drivability, etc. The various concepts introduced above and discussed in greater detail below may be implemented in any number of ways, as the concepts described are not limited to any particular manner of implementation. Examples of specific implementations and applications are provided primarily for illustrative purposes.

While a CACC system may provide fuel economy benefits, the CACC system has been found to increase the number of unnecessary gear shifting events within a vehicle. The increased number of unnecessary gear shifting events may cause a reduction in fuel economy benefits provided by the CACC system. Additionally, the increased number of gear shifting events may create some drivability and service concerns for vehicles implementing the CACC system (e.g., the more shifts may cause additional wear and tear on the transmission thereby leading to more frequent service events). Systems and methods for gear shifting management to reduce unnecessary gear shifting are described herein.

Referring to the Figures generally, various embodiments disclosed herein relate to systems and methods for improved gear shifting management for a vehicle when a CACC system is enabled for the vehicle. In some embodiments, the vehicle may be a part of a platoon. The platoon may include additional vehicles with a CACC system. Further, at least some of the vehicles may be capable of autonomous operation and also include gear shifting management systems. As described herein, the gear shifting management system transforms operation of the CACC system to provide various benefits of the vehicle and/or vehicle(s) of the platoon. In this regard, the systems and methods described herein minimize the number of unnecessary gear shift events that may arise during a CACC operation mode (e.g., when the CACC system is enabled) of the vehicle to improve fuel economy, improve drivability, and other features and benefits described herein.

In some embodiments, the vehicle implementing a CACC system and improved gear shifting management may be an automated (e.g., at least partly self-driving) vehicle. The vehicle may include varying levels of automation ranging from partially automated (e.g., cruise control being enabled) to fully enabled (e.g., vehicle completely drives itself). For example, the vehicle may enable up to a level 5 of automation, which enables full automated driving. Level 0 provides for no driving automation, Level 1 provides for some driver assistance, Level 2 provides for partial driving automation, Level 3 provides for conditional driving automation, Level 4 provides for high driving automation, and Level 5 (the highest level) provides for full driving automation. Depending on the level of automation, the self-driving vehicle may control the transmission (e.g., shift gears) automatically without input from a human driver. The systems and methods described herein may improve automated gear shifting within a self-driving vehicle to minimize the amount of gear shift events.

The gear shifting management system may minimize or reduce the number of unnecessary gear shift events in a variety of ways, as described herein. In one embodiment, the gear shifting management system minimizes potentially unnecessary gear shift events by updating the transmission map for determining gear shifts or gear shift events. The transmission map may be updated or adapted by increasing the shift thresholds within the transmission map (e.g., engine speed thresholds for upshifting/downshifting). As a result and as an example, upshifting is delayed so that the vehicle stays in a lower gear relatively longer before an upshift shift event occurs. In another embodiment, the gear shifting management system minimizes potentially unnecessary gear shift events by determining if a vehicle can override a request to upshift or downshift by maintaining the current transmission setting or gear based on a current position of the vehicle and on one or more CACC vehicle states or look ahead information. The one or more CACC vehicle states (also referred to as CACC information) may include a following distance to a lead vehicle, a vehicle speed, surroundings of a vehicle, and/or a vehicle weight. In yet other embodiments, the gear shifting management system minimizes potentially unnecessary gear shift events by utilizing a predictive gear shifting feature calibrated to account for one or more CACC vehicle states.

In operation, a controller of a vehicle is configured to implement the gear shifting management system of the vehicle. The controller may be configured to receive look ahead information (e.g., traffic information, weather conditions, road grade conditions, emissions information (e.g., zero or low emission zones), speed limits and traffic signs, vehicle proximity distance, etc.) from a variety of sources (e.g., proprietary and/or openly available sources) and use this information to predict gear shift events. The controller may then analyze the CACC states of the vehicle to determine whether the vehicle may avoid the predicted gear shift events. If the controller determines that the vehicle may avoid the unnecessary gear shift event, then the controller maintains the current gear position/setting for the transmission of the vehicle. Such a process may improve drivability of the vehicle. These and other features and benefits are described in more detail below.

Referring now to FIG. 1, a vehicle 100 in a networked or intelligent transportation system 50 is shown, according to an example embodiment. The system 50 is shown to include a vehicle 100 coupled over a network to one or more external information sources 170. The term "external" refers to a component or system outside of the vehicle 100. While only one vehicle 100 is shown, it should be understood that multiple vehicles may be included to represent a fleet arrangement, a platoon arrangement, and/or a combination thereof.

The network 51 may be any type of communication protocol or network that facilitates the exchange of information between and among the vehicle 100 and the external information sources 170. In one embodiment, the network 51 may be configured as a wireless network. In this regard, the vehicle 100 may wirelessly transmit and receive data from the external information sources 170. The wireless network may be any type of wireless network, such as Wi-Fi, WiMAX, Geographical Information System (GIS), Internet, Radio, Bluetooth, ZigBee, satellite, radio, Cellular, Global System for Mobile Communications (GSM), General Packet Radio Service (GPRS), Long Term Evolution (LTE), etc. In an alternate embodiment, the network 51 may be configured as a wired network or a combination of wired and wireless protocol. For example, the controller 140 and/or telematics unit 145 of the vehicle 100 may couple via fiber optic cable to the network 51 to selectively transmit and receive data wirelessly to and from the external information sources 170.

The external information sources 170 may be any information (e.g., data, values, etc.) provider/source capable of providing external information to the vehicle 100. The external information refers any information that may be obtained from external sources. The external information source 170 is shown to include a remote computing system 171 and other vehicle(s) 182. The external information sources 170 may also include other systems/devices such that this depiction is not meant to be limiting. For example, other sources of external information (e.g., a global positioning system satellite that provides latitude, longitude, and/or elevation data) are also contemplated. Additionally, the external information sources 170 may provide dynamic information (e.g., information that may change as a function of time) regarding, for example, a traffic density at a particular location at a particular time, a weather condition at a particular location at a particular time, etc. Thus, the "dynamic information" may be information that may change as a function of time, such as weather, traffic density, and the like. In the example shown, the external information sources 170 include a remote computing system 171 and other vehicles 182.

The remote computing system 171 may be associated (e.g., owned by, managed by, controlled by, etc.) with a provider entity. The provider entity may be a service and/or product provider, such as an engine manufacturer, vehicle/equipment controller provider/manufacturer, and so on. The remote computing system 171 may include a processing circuit having a processor 173 and a memory 175, a transmission map(s) database 172, a look ahead map(s) database 174, and a communication interface 176. The remote computing system 171 may communicate with the vehicle 100 over the network 51 through the communications interface 176.

The processor 173 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, another type of suitable processor, or any combination thereof designed to perform at least certain of the functions described herein. In this way, the processor 173 may be a microprocessor, a state machine, or other suitable processor. The processor 173 also may be implemented as a combination of computing devices, such as a combination of a DSP and a microprocessor, a plurality of microprocessors, one or more microprocessors in conjunction with a DSP core, or any other such configuration.

The memory device 175 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 175 may be communicably coupled to the processor 173 to provide computer code or instructions to the processor 173 for executing at least some of the processes described herein. Moreover, the memory device 175 may be or include tangible, non-transient volatile memory or non-volatile memory. Accordingly, the memory device 175 may include database components, object code components, script components, or any other type of information structure for supporting the various activities and information structures described herein.

The transmission map(s) database 172 may be a database configured to store and selectively provide one or more transmission maps. A transmission map defines when a vehicle shifts gears based on one or more vehicle operating conditions. The transmission map may be one or more look-up tables, models, and so on. The processor 173 may access the transmission map database 172 to provide one or more transmission maps to one or more vehicles over the network. The transmission maps may be stored within the database according to a variety of parameters including, but not limited to, engine-transmission arrangement, a region of travel, a transmission model number, duty cycle and/or other parameters defining operation of the vehicle, a combination thereof, and so on.

The look ahead map(s) database 174 includes information including, but not limited to, road grade data (e.g., the road grade at various spots along various routes), speed limit data (e.g., posted speed limits in various road locations), elevation or altitude data at points along a route, curvature data at points along the route, locations of intersections along the route, etc. The processor 173 may access the look ahead map database 174 to provide certain stored information to one or more vehicles over the network.

The external information source 170 may also include other vehicles 182. In this regard, the vehicle 100 may communicate with one or more other vehicles wireless (e.g., via NFC, Bluetooth, etc.) to obtain data regarding one or more upcoming conditions for the vehicle 100. For example, the vehicle 100 may communicate with one or more vehicles in the same platoon and/or fleet as vehicle 100 to obtain data to facilitate CACC operation of the vehicle 100.

Referring now to the vehicle 100 of FIG. 1, the vehicle 100 is communicably coupled with the external information sources 170 via the network 51. The vehicle 100 may be configured as an on-road or an off-road vehicle (e.g., front end loaders, bulldozers, etc.) including, but not limited to, line-haul trucks, mid-range trucks (e.g., pick-up truck), cars (e.g., sedans), and any other type of vehicle that may have a CACC system. As alluded to above, in some embodiments, the vehicle 100 may be one vehicle in a platoon of vehicles and/or in a fleet of vehicles. For example in the platoon situation, vehicle 100 may be a lead vehicle (i.e., the foremost vehicle) within the platoon of vehicles. As another example, the vehicle 100 may be a follower vehicle (i.e., behind the lead vehicle) within the platoon of vehicles.

The vehicle 100 may be structured as an internal combustion engine driven vehicle (e.g., gasoline, diesel, natural gas or another type of fuel that is combusted and used to power the vehicle), an at least partially hybrid vehicle (e.g., parallel or series hybrid vehicle that includes one or more electric motors and one or more internal combustion engines), a full electric vehicle (e.g., no internal combustion engine), a fuel cell or another alternative energy-driven vehicle, and so on. In the example shown, the vehicle 100 is driven, at least partly, by an internal combustion engine.

The vehicle 100 is shown to include a powertrain system 120 having an internal combustion engine 125, an exhaust aftertreatment system 115, a CACC system 155, a transmission control unit (TCU) 160 coupled to a transmission 135, and a controller 140. The controller 140 is communicably coupled to each of the aforementioned components. In some embodiments, the vehicle 100 may also optionally include a telematics unit 145 housed within the vehicle. If the vehicle 100 includes the telematics unit 145, the telematics unit 145 is communicably coupled to controller 140 and enables communication with one or more external information sources via the network.

The powertrain system 120 facilitates power transfer from the engine 125 to power and/or propel the vehicle 100. In some embodiments, the powertrain system 120 is structured as a conventional non-electrified powered powertrain (e.g., no electric motors powered by one or more batteries or fuel cells to drive the vehicle). In other embodiments as mentioned above, the powertrain system 120 may be an electric/hybrid powertrain. Accordingly, the instant depiction is not meant to be limiting. The powertrain system 120 includes an engine 125 operably coupled to a transmission 135 that is operatively coupled to a drive shaft 103, which is operatively coupled to a differential 104, where the differential 104 transfers power output from the engine 125 to the final drive, which is shown as wheels 105, but may be tracks or other mechanisms in other embodiments.

If the powertrain system 120 is an electric/hybrid powertrain, it may include an electric machine such as a motor generator. The electric machine may include a torque assist feature, a regenerative braking energy capture ability, a power generation ability, and any other feature of motor generators used in hybrid vehicles. In this regard, the electric machine may be any conventional motor generator that is capable of generating electricity and producing a power output to drive the transmission 135. The electric machine may include a power conditioning device such as an inverter and a motor controller.

As a brief overview, the engine 125 receives a chemical energy input (e.g., a fuel such as gasoline or diesel) and combusts the fuel to generate mechanical energy, in the form of a rotating crankshaft. As a result of the power output from the engine 125, the transmission 135 may manipulate the speed of the rotating input shaft (e.g., the crankshaft) to effect a desired drive shaft 103 speed. The rotating drive shaft 103 is received by a differential 104, which provides the rotation energy of the drive shaft 103 to the final drive 105. The final drive 105 then propels or moves the vehicle 100.

The engine 125 may be structured as any internal combustion engine (e.g., compression-ignition or spark-ignition), such that it can be powered by any fuel type (e.g., diesel, ethanol, gasoline, etc.). In the example shown, the engine 125 is structured as a compression-ignition engine that combusts diesel fuel. The transmission 135 may be structured as a continuously variable transmission (CVT) and/or as an automatic transmission (e.g., a dual-clutch transmission, semi-automatic, and other types of automatic transmission). In the example shown, the transmission 135 comprises a plurality of gears or settings and is an automatic transmission, such that shifting may be controlled automatically and without user by an electronic control unit (e.g., via the TCU 10 and/or controller 140). Via the plurality of settings or gears, the transmission can affect different output speeds based on the engine speed. The final drive 105 may be structured in any configuration dependent on the application (e.g., the final drive 105 is structured as wheels in an automotive application like as shown with the vehicle 100). Further, the drive shaft 103 may be structured as a one-piece, two-piece, and a slip-in-tube driveshaft based on the application.

As described briefly above, the CACC system 155 may be configured to automatically control the speed, acceleration, and deceleration of the vehicle 100. The CACC system 155 is a combination of hardware and software components configured to work together to control the movement of the vehicle 100. The CACC system 155 may include one or more processing circuits configured receive information, synthesize the information, and control the hardware components based on the synthesized information. For example, the processing circuit may receive vehicle state information (e.g., the speed of the vehicle, the weight of the vehicle, set cruise control speed, etc.) from one or more sensors of the vehicle 100 (or determine such information from various information), look ahead information (e.g., upcoming portion of the vehicle's route), and information about the vehicle's immediate surrounding area (e.g., adjacent vehicles and objects) from sensors and radars associated with the vehicle. The processing circuit associated the CACC system 155 may evaluate this information and determine one or more control values to be implemented by the hardware components of the CACC system 155. The hardware components may include sensors and radars configured to collect information about the vehicle 100 and the vehicle's surroundings. The hardware components may also include an actuator configured to control the vehicle speed by controlling throttle valve which determines the amount of air intake into the engine. The hardware components may also include user input/output devices to receive information from a user (e.g., the user's desired cruise control set speed) or provide information to the user. In some embodiments, at least part of the CACC system (e.g., the processing circuit) may be included with the controller 140.

The transmission 135 may be operably coupled to a transmission control unit (TCU) 160. The TCU 160 may be communicably coupled to the controller 140 and may receive vehicle information, commands, instructions, etc. from the controller 140. The TCU 160 may be configured to monitor the status of the transmission 135 (e.g., monitor transmission settings) and change the transmission settings (e.g., shift gears) based on information regarding the vehicle 100. The TCU 160 may be configured to work in conjunction with the CACC system 155 to reduce the amount of gear shifts within the vehicle 100 as will be described in more detail below. In some embodiments, the TCU 160 is included with the controller 140 so that the functions of the TCU 160 may be performed by the controller 140 (e.g., shifting of gears of the transmission).

As also shown, the vehicle 100 includes an exhaust aftertreatment system 115 coupled to and particularly, in fluid communication with, the engine 125. The exhaust aftertreatment system 115 receives exhaust gas from the combustion process in the engine 125 and reduces the emissions from the engine 125 to less environmentally harmful emissions (e.g., reduce the NOx amount, reduce the emitted particulate matter amount, etc.). The exhaust aftertreatment system 115 may include any component used to reduce engine exhaust emissions, such as a selective catalytic reduction catalyst, a diesel oxidation catalyst, a diesel particulate filter, a diesel exhaust fluid doser coupled to a supply of diesel exhaust fluid, a plurality of sensors for monitoring the system 115 (e.g., a NOx sensor, CO sensor, particulate matter sensors, a greenhouse gas sensor, exhaust gas flow and pressure sensors, ammonia sensors, etc.), a three-way catalyst, an exhaust aftertreatment system heater, etc. It should be understood that other embodiments may exclude an exhaust aftertreatment system and/or include different, less than, and/or additional components than that listed above. Further, the spatial arrangement of the components/systems of the exhaust aftertreatment are highly configurable. All such variations are intended to fall within the spirit and scope of the present disclosure.

The vehicle 100 is also shown to optionally include a telematics unit 145. The telematics unit 145 may be structured as any type of telematics unit. Accordingly, the telematics unit 145 may include, but is not limited to, a location positioning system (e.g., global positioning system) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 145 and one or more remote devices (e.g., a provider/manufacturer of the telematics device, etc.). In this regard, the communications interface may be configured as any type of mobile communications interface or protocol including, but not limited to, Wi-Fi, WiMAX, Internet, Radio, Bluetooth, ZigBee, satellite, radio, Cellular, GSM, GPRS, LTE, and the like. The telematics unit 145 may also include a communications interface for communicating with the controller 140 of the vehicle 100. The communication interface for communicating with the controller 140 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, ZigBee, cellular, radio, etc. In one embodiment, a controller area network (CAN) bus including any number of wired and wireless connections provides the exchange of signals, information, and/or data between the controller 140 and the telematics unit 145. In other embodiments, a local area network (LAN), a wide area network (WAN), or an external computer (for example, through the Internet using an Internet Service Provider) may provide, facilitate, and support communication between the telematics unit 145 and the controller 140. In still another embodiment, the communication between the telematics unit 145 and the controller 140 is via the unified diagnostic services (UDS) protocol. All such variations are intended to fall within the spirit and scope of the present disclosure. In another embodiment, the telematics unit 145 may be excluded and the communication interface of the controller 140 may communicate with remote systems directly.

The controller 140 is coupled to the powertrain 120, the aftertreatment system 115, the telematics unit 145, the CACC system 155, transmission, and the TCU 160, among other devices, components, and/or systems of the vehicle 100. The controller 140 may be structured to control, at least partly, the operation of the vehicle 100. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 140 is communicably coupled to the systems and components in the vehicle 100 of FIG. 1, the controller 140 is structured to receive data (e.g., instructions, commands, signals, values, etc.) from one or more of the components of the vehicle 100 shown in FIG. 1. This may generally be referred to as internal vehicle information (e.g., data, values, etc.). The internal vehicle information represents determined, acquired, predicted, estimated, and/or gathered data regarding one or more components in vehicle 100.

Accordingly, the internal vehicle information may include data regarding the powertrain system 120 and other components in the vehicle 100. For example, the data regarding the powertrain system 120 and vehicle 100 may include, but is not limited to, the vehicle speed, the current transmission gear/setting, the load on the vehicle/engine, a throttle position, a set cruise control speed, data relating to the exhaust aftertreatment system 115, output power, engine speed, fluid consumption rate (e.g., fuel consumption rate, diesel exhaust fluid consumption rate, etc.), any received engine/vehicle faults (e.g., a fault code indicating a low amount of diesel exhaust fluid, diagnostic trouble codes, etc.), engine operating characteristics (e.g., whether all the cylinders are activated or which cylinders are deactivated, etc.), etc. Data relating to the exhaust aftertreatment system 115 includes, but is not limited to, NOx emissions, particulate matter emissions, conversion efficiency of one or more catalysts in the system 115 (e.g., the selective catalytic reduction catalyst), etc.

The internal vehicle information may be stored by the controller 140 and selectively transmitted to one or more desired sources (e.g., another vehicle such as in a vehicle-to-vehicle communication session, a remote operator such as the remote computing system 171, etc.). In other embodiments, the controller 140 may provide the internal vehicle information to the telematics unit 145 whereby the telematics unit transmits the internal vehicle information to one or more desired sources (e.g., a remote device, an operator of the telematics unit, etc.). All such variations are intended to fall within the spirit and scope of the present disclosure.

The controller 140 is coupled to a CACC system 155 that implements CACC or a CACC operating mode with the vehicle 100. In operation, the CACC system 155 may use information received from one of the other vehicles within the same platoon and/or fleet as vehicle 100 to control, at least partly, the vehicle. When CACC is enabled within vehicle 100, the speed of vehicle 100 is controlled without or substantially without a user having to keep an accelerator pedal depressed. The CACC system 155 functions similarly to an adaptive cruise control system where a vehicle controller automatically controls the speed of a vehicle according to a set cruise control speed and a certain following distance behind another vehicle. For example, if a first vehicle's cruise control set speed is set to 70 MPH but a second vehicle in front of the first vehicle is moving at 65 MPH, then the adaptive cruise control system automatically slows the vehicle (e.g., actuates the vehicle brakes) so as to maintain the certain following distance behind the second vehicle.

The cooperative cruise control system 155 improves upon adaptive cruise control system by utilizing communications between the vehicle 100 and another vehicle (e.g., V2V communication) via the communication interface 245 of the controller 140 and a communication interface of another vehicle. The vehicle-to-vehicle communication between the vehicles allows the vehicles to coordinate their movements leading to shorter, more stable consistent separation distances, and more accurate following distances between the vehicles. For example, if vehicle 100 is the lead vehicle and is preparing to brake, the vehicle 100 may communicate this anticipated action to a second vehicle. Given this communication, the second vehicle may also prepare to brake leading to the first and second vehicle braking cooperatively (e.g., at a similar time). Since the first vehicle 100 (in this example, the vehicle 100 is the lead vehicle) and the second vehicle brake cooperatively, the following distance between the first and second vehicle may be shortened. As described above, each or at least some of the vehicles including the vehicle 100 within a platoon may utilize a CACC system so that the vehicles within the platoon may operate cooperatively with the other vehicles within the platoon leading to an improved fuel economy for at least some of the vehicles within the platoon.

The CACC system 155 works with the controller 140 and the transmission control unit 160 to automatically select and shift to desired gears within the transmission 135 without or substantially without human intervention. For example, the CACC system 155 may implement a cruise control set speed for the vehicle 100 (based on a user input). The controller 140 may determine a transmission setting for the vehicle 100 based on the cruise control set speed and the transmission map (e.g., $4^{th}$ gear, $6^{th}$ gear, etc.), and the transmission control unit 160 may implement the transmission setting in the transmission 135.

While operation of the CACC system 155 may generally improve the fuel economy of vehicle 100, operating the vehicle 100 in the CACC operation mode (e.g., when the CACC system 155 is enabled with vehicle 100) may also cause the vehicle 100 to have an increased amount of gear shift events, some of which may be unnecessary. An unnecessary gear shift event may be defined as when the transmission 135 shifts the transmission setting or gear for the vehicle 100 based on CACC operation of the vehicle unnecessarily. For example, when the vehicle 100 approaches a downhill portion of the vehicle's route, the CACC system 155 may request a slight deceleration for a short period of time in order to maintain a certain following distance. This slight deceleration may lead to a temporary engine braking which causes the vehicle to shift to a lower gear unnecessarily given that the engine braking is only temporary. As described herein, the controller 140 is structured to minimize these unnecessary gear shift events. The controller 140 may minimize the unnecessary gear shift events using one or more methods or processes. These methods may be used in tandem or may be used separately to minimize the unnecessary gear shift events.

The controller 140 may change, modify, or otherwise update the transmission map used by the vehicle 100 when operating the vehicle 100 in CACC operation mode in order to achieve or attempt to achieve one or more objectives, such as minimizing an amount of unnecessary gear shift events. A transmission map or shift schedule defines certain operating conditions in which the transmission shifts transmission settings or gears (which may be commanded by the TCU directly or the controller 140). For example, a transmission map may be configured as a look up table that defines gear shift points based on a throttle position (e.g., how much the throttle is open) and a vehicle speed. In some embodiments, the transmission map(s) database 172 may store one or more transmission maps that may be selectively deployed to the controller 140 of the vehicle 100 to guide transmission shifting of the vehicle 100 during different operating conditions. For example, the transmission map(s) database 172 may include a CACC transmission map that may be used during a CACC operation mode of the vehicle. As another example, the transmission map(s) database 172 may include a conventional transmission map that may be used during conventional vehicle operation (e.g., when the CACC operation mode is not enabled). During conventional vehicle operation, the conventional transmission map may have increased sensitivity to torque demands made by the vehicle when changing speed. For example, if a vehicle is not using CACC, then it may be appropriate for the vehicle to change gears more readily (e.g., have increased sensitivity to torque demands in the transition map) in order to accommodate more sudden braking that may occur because of the lack of vehicle to vehicle communication. But when the CACC operation mode is enabled within the vehicle 100, this increased sensitivity may not be necessary (and ultimately not desired) because vehicle-to-vehicle communication allows the vehicle 100 to communicate with other vehicles within its platoon and/or fleet, and operate cooperatively thereby reducing the amount of sudden braking that may occur. Therefore, the controller 140 may update the transmission map used by the vehicle 100 to be the CACC transmission map during a CACC operation mode of the vehicle in order to avoid unnecessary gear shift events. In one embodiment, the updated transmission map may have relatively less gear shift sensitivity when the vehicle 100 is operating at higher speeds and therefore at higher gears. Gear shift sensitivity refers to how small the torque and/or speed ranges are within a transmission map to trigger a gear shift. A transmission map with high gear shift sensitivity may have tighter/smaller ranges while a transmission map with low gear shift sensitivity may have broader/wider ranges.

The controller 140 may also minimize or reduce the amount of potentially unnecessary gear shift events by maintaining a current gear setting despite a conventional transmission shift schedule or map calling for an upshift or downshift to occur. More specifically, the controller 140 may analyze look ahead information (e.g., road grade data, traffic data, etc.) obtained by the controller 140 to predict a gear shift event. Then, the controller 140 analyzes the predicted gear shift event and a CACC vehicle state (e.g., a following distance, a vehicle speed, a vehicle weight, etc.) to determine if the vehicle may remain in its current gear to maintain a set cruise control speed and/or separation distance in order to avoid the gear shift event. For example, the controller 140 may analyze look ahead information and determine that the vehicle will be traversing a downhill portion of the vehicle's route. During the downhill portion of the vehicle's route, the CACC system 155 may request a slight deceleration in the vehicle for a short period of time in order to maintain a certain following distance (and/or speed). This slight deceleration may lead to a temporary engine braking (or other braking) which may cause the vehicle to typically shift to a lower gear given that the braking is only temporary. Given the slight deceleration request made by the CACC system, the controller 140 may determine that this typical shift event is unnecessary based on the look ahead information (e.g., the downhill portion lasts less than a predefined amount of time and/or distance). Accordingly, the controller 140 may keep the transmission at its current setting or gear and not implement the transmission shift event.

As another example, the controller 140 may analyze vehicle information (e.g., the following distance, the vehicle speed, the vehicle weight, etc.) to determine whether to keep the transmission in its current gear. Typically, traversing an uphill or a downhill portion of a vehicle's route triggers a gear shift event. But depending on the length of the uphill or downhill portion of a vehicle's route, a gear shift event may not be required. For example, if the vehicle is traversing a short downhill portion of the vehicle's routes (e.g., less than 100 feet or a predefined distance (e.g., via a remote operator, via the user, etc.), a gear shift event may not be required. In that case, the controller 140 may command the transmission of the vehicle to stays in its current gear in order to avoid the unnecessary gear shift event. On the other hand, if the downhill portion of the vehicle's route is longer than the predefined distance (e.g., more than 100 feet), a gear shift event may be necessary. In this case, the controller 140 may determine that the gear shift event is actually necessary to traverse the downhill and will not command that the transmission of vehicle remains in its current gear.

In yet another embodiment, the controller 140 may minimize gear shift events by integrating a predictive gear shifting circuit 242 with the controller 140. The predictive gear shifting circuit 242 uses look ahead information to predict a future gear shift of the vehicle and implement that gear shift early in order to increase vehicle performance and/or fuel economy savings. More specifically, the predictive gear shifting circuit 242 defines the speed of the vehicle respective to a predicted parameter of the vehicle. The predicted parameter may include a predicted load of a vehicle, a predicted power demand of a vehicle, a predicted torque of the vehicle, a combination thereof, etc. Additionally, the predictive gear shifting circuit 242 may utilize dynamic vehicle information (e.g., look ahead information, etc.) to predict a future state of a vehicle. The predictive gear shifting circuit 242 may utilize the predicted future state of the vehicle to determine a predicted parameter for the vehicle. The predictive gear shifting circuit 242 may include a machine learning model that utilizes vehicle testing data and vehicle operational data that accumulates over time to train the machine learning model to recognize unnecessary gear shifting events. In some embodiments, the machine learning model may include some predefined metrics that when compared to vehicle operational data indicate whether a gear shift event is necessary or unnecessary.

For example, the predictive gear shifting feature may use look ahead information to predict that the vehicle may be traversing an uphill portion of the vehicle's route. The predictive gear shifting circuit 242 may then shift the vehicle's gear into a higher gear before the vehicle begins traversing the uphill so that the vehicle may maintain its current speed and acceleration while traversing the uphill portion of the route. The predictive gear shifting circuit 242 may minimize the gear shift events by calibrating the predictive gear shifting circuit based on the CACC operation mode being enabled on the vehicle. More specifically, the controller 140 calibrates the predictive gear shifting circuit 242 based on one or more CACC vehicle states (e.g., a following distance, a vehicle speed, a vehicle weight, a combination thereof, etc.). Then the predictive gear shifting circuit 242 may override potentially unnecessary gear shifts.

As the components of FIG. 1 are shown to be embodied in a vehicle, the controller 140 may be structured as one or more electronic control units (ECU). The controller 140 may be separate from or included with at least one of the transmission control unit 160, an exhaust aftertreatment control unit, a powertrain control module, an engine control module, an electric machine controller, etc. In one embodiment, the depicted components of the controller 140 are combined into a single unit. In another embodiment, one or more of the components of the controller 140 (or other controllers not depicted, such as an aftertreatment system controller, etc.) may be geographically dispersed throughout the vehicle (e.g., in separate locations of the vehicle). When there are multiple controllers or components, a datalink (e.g., a J1939 communication network) or CAN bus may connect the multiple controllers to provide shared information. The datalink (or other communication structures) allow the controller 140 to recognize faults, failures, and other information from each of the connected controllers or components. The function and structure of the controller 140 is described in greater detail in FIG. 2.

Figure 2:
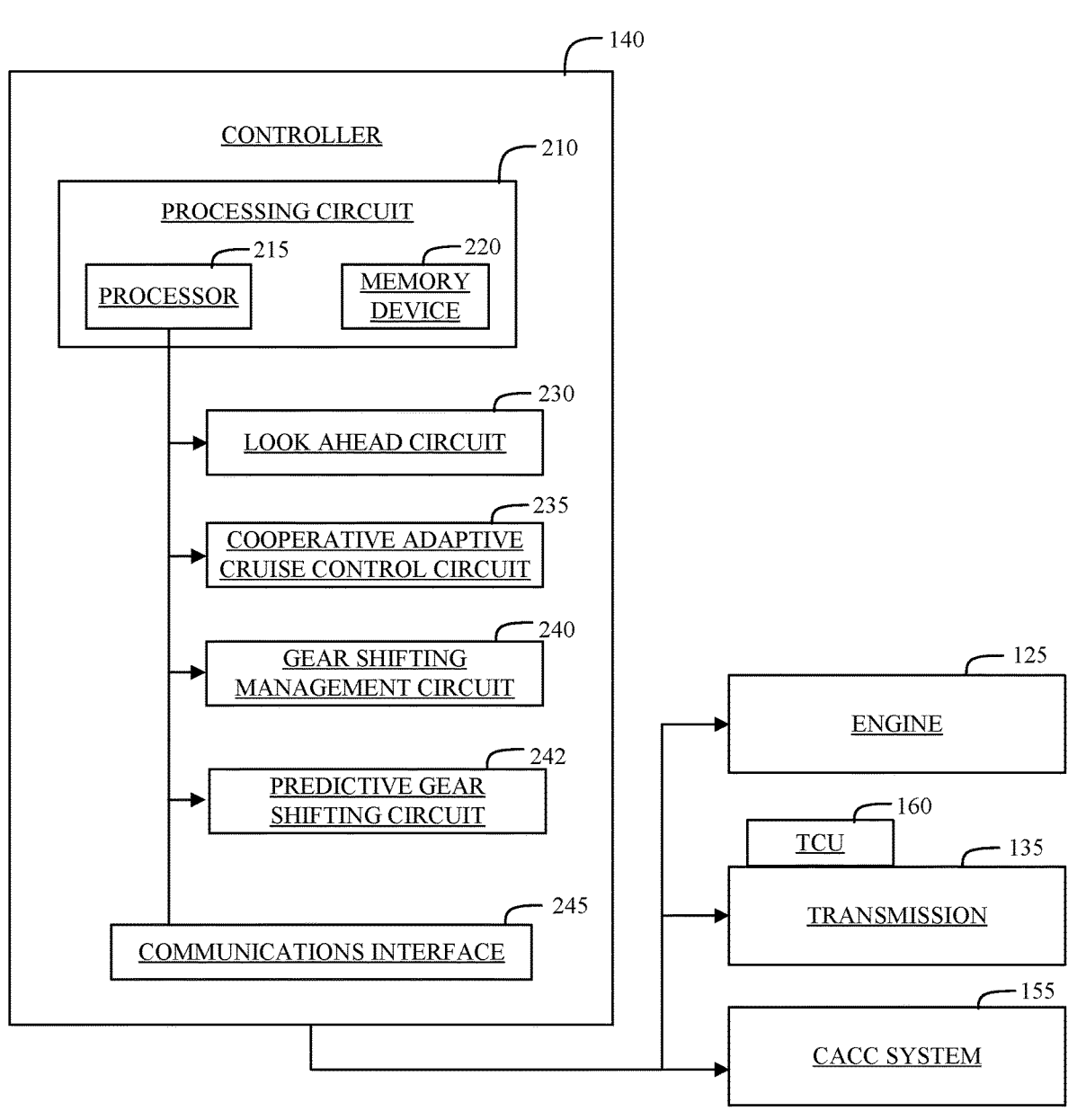
FIG. 2 is a schematic diagram of the controller of the vehicle of FIG. 1 coupled to various components of the vehicle of FIG. 1, according to an exemplary embodiment.

Referring now to FIG. 2, a schematic diagram of the controller 140 of the vehicle 100 of FIG. 1 coupled to the engine 125, the transmission 135, the CACC system 155 and the TCU 160 is shown, according to an example embodiment. In some embodiments, the controller 140 controls the operation for various vehicle components (e.g., the engine 125, the transmission 135, the CACC system 155, and/or the TCU 160).

As shown in FIG. 2, the controller 140 includes a processing circuit 210 having a processor 215 and a memory or memory device 220. The controller 140 also includes a look ahead circuit 230, a cooperative adaptive cruise control circuit 235, a gear shifting management circuit 240, the predictive gear shifting circuit 242, and a communications interface 245. The controller 140 is structured to minimize unnecessary gear shift events to improve fuel economy and drivability for the vehicle 100. In operation, the controller 140 is configured to control various vehicle components (e.g., transmission, engine, etc.) to minimize gear shift events when the CACC operation mode is enabled within the vehicle 100.

In one configuration, the look ahead circuit 230, the cooperative adaptive cruise control circuit 235, the gear shifting management circuit 240, and the predictive gear shifting circuit 242 are embodied as machine or computer-readable media that stores instructions and that is executable by a processor, such as processor 215. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the look ahead circuit 230, the cooperative adaptive cruise control circuit 235, the gear shifting management circuit 240, and the predictive gear shifting circuit 242 are embodied as hardware units such as electronic control units. In another configuration, the look ahead circuit 230, the cooperative adaptive cruise control circuit 235, the gear shifting management circuit 240, and the predictive gear shifting circuit 242 may be embodied as one or more circuitry components including, but not limited to, processing circuitry, network interfaces, peripheral devices, input devices, output devices, sensors, etc. In some embodiments, the look ahead circuit 230, the cooperative adaptive cruise control circuit 235, the gear shifting management circuit 240, and the predictive gear shifting circuit 242 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the look ahead circuit 230, the cooperative adaptive cruise control circuit 235, the gear shifting management circuit 240, and the predictive gear shifting circuit 242 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The look ahead circuit 230, the cooperative adaptive cruise control circuit 235, the gear shifting management circuit 240, and the predictive gear shifting circuit 242 may also include programmable hardware devices such as field programmable gate arrays, programmable array logic, programmable logic devices or the like. The look ahead circuit 230, the cooperative adaptive cruise control circuit 235, the gear shifting management circuit 240, and the predictive gear shifting circuit 242 may include one or more memory devices for storing instructions that executable by the processor(s) of the look ahead circuit 230, the cooperative adaptive cruise control circuit 235, the gear shifting management circuit 240, and the predictive gear shifting circuit 242. The one or more memory devices and processor(s) may have the same or similar definition as provided below with respect to the memory device 220 and processor 215. In some hardware unit configurations, the look ahead circuit 230, the cooperative adaptive cruise control circuit 235, the gear shifting management circuit 240, and the predictive gear shifting circuit 242 may be geographically dispersed throughout separate locations in the vehicle. Alternatively and as shown, the look ahead circuit 230, the cooperative adaptive cruise control circuit 235, the gear shifting management circuit 240, and the predictive gear shifting circuit 242 may be embodied in or within a single unit/housing, which is shown as the controller 140.

In the example shown, the controller 140 includes the processing circuit 210 having the processor 215 and the memory device 220. The processing circuit 210 may be structured or configured to execute or implement the instructions, commands, and/or control processes described herein with respect to the look ahead circuit 230, the cooperative adaptive cruise control circuit 235, the gear shifting management circuit 240, and the predictive gear shifting circuit 242. The depicted configuration represents the look ahead circuit 230, the cooperative adaptive cruise control circuit 235, the gear shifting management circuit 240, and the predictive gear shifting circuit 242 as instructions stored in non-transitory machine or computer-readable media. However, as mentioned above, this illustration is not meant to be limiting as the present disclosure contemplates other embodiments the look ahead circuit 230, the cooperative adaptive cruise control circuit 235, the gear shifting management circuit 240, and the predictive gear shifting circuit 242, or at least one circuit of the look ahead circuit 230, the cooperative adaptive cruise control circuit 235, the gear shifting management circuit 240, and the predictive gear shifting circuit 242, is configured as a hardware unit. All such combinations and variations are intended to fall within the scope of the present disclosure.

The processor 215 may be one or more of a single- or multi-chip processor, a digital signal processor (DSP), an application specific integrated circuit (ASIC), a field programmable gate array (FPGA), or other programmable logic device, discrete gate or transistor logic, discrete hardware components, another type of suitable processor, or any combination thereof designed to perform the functions described herein. In this way, the processor 215 may be a microprocessor, a state machine, or other suitable processor. The processor 215 also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the look ahead circuit 230, the cooperative adaptive cruise control circuit 235, and the gear shifting management circuit 240 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 220 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 220 may be communicably coupled to the processor 215 to provide computer code or instructions to the processor 215 for executing at least some of the processes described herein. Moreover, the memory device 220 may be or include tangible, non-transient volatile memory or non-volatile memory. Accordingly, the memory device 220 may include database components, object code components, script components, or any other type of information structure for supporting the various activities and information structures described herein.

The look ahead circuit 230 is structured to receive and process look ahead information regarding an upcoming or likely upcoming route of the vehicle 100. The "route" may be predefined by a vehicle operator (e.g., using a mapping software such as a commercial maps program, such as Google® Maps to plan a trip), a remote operator, and/or may be defined/determined as a predetermined distance ahead of the vehicle's current location (e.g., 0.5 miles, 1.5 miles, 5 miles, etc.). In this latter situation, the look ahead circuit 230 may estimate or predict the route of the vehicle. The current position of the vehicle may be determined by the telematics unit 145, another positioning system onboard the vehicle (e.g., a GPS system), an explicit user input, a satellite positioning system, and/or some combination thereof. The route may alternatively be determined by the look ahead circuit 230 using external information sources 170 (e.g., look ahead map(s) database 174), the telematics unit 145, or a combination of the external information sources and the telematics unit. For example, the look ahead map based database 174 may include road grade data (e.g., the road grade at various spots along various routes), speed limit data (e.g., posted speed limits in various road locations), elevation or altitude data at various points along a route, curvature data at various points along a route, location of intersections along a route, and/or any other information that may be obtained from a map (e.g., a satellite map). Look ahead information may also include, but is not limited to, dynamic information such as traffic information, weather conditions, road grade conditions, vehicle proximity distance to other vehicles, etc. Look ahead information may be stored by the look ahead circuit 230 (e.g., stored information regarding various roads) and/or received from one or more external information sources 170. The look ahead information may be received through the communications interface 245. The look ahead circuit 230 is configured to provide look ahead information to the gear shifting management circuit 240. The gear shifting management circuit 240 may then use the look ahead information to predict or determine a future/upcoming gear shift event.

The cooperative adaptive cruise control circuit (CACC) 235 is structured to determine and/or receive a predefined following distance and/or vehicle speed for a vehicle 100 to implement a CACC operating mode with the vehicle 100 (e.g., 70 MPH and a separation distance of 20 feet, 70 MPH, a separation distance of 20 feet, etc.). The predefined following distance and/or vehicle speed may be received from an operator input/output device (e.g., touchscreen on a dashboard, etc.). As described above, the cooperative adaptive cruise control circuit facilitates communication between the vehicle 100 and one or more surrounding vehicles (e.g., a lead vehicle, trailing vehicle, vehicles on the side of the vehicle 100, etc.). The vehicle-to-vehicle communication between the vehicle 100 and the one or more surrounding vehicles (e.g., vehicle's ahead, behind, or to the side of vehicle 100) allows the vehicle 100 and the one or more surrounding vehicles to coordinate their movements leading to, for example, shorter, more stable, and more accurate following distances between the vehicle 100 and a lead vehicle in front of vehicle 100.

In some embodiments, the cooperative adaptive cruise control circuit 235 may determine at least one of a predefined following distance or vehicle speed based on look ahead information. For example, the controller 140 predicts or determines a vehicle's route using look ahead information and automatically adjusts the vehicle's cruise control set speed according to the determined route in order to, among potentially other benefits, conserve fuel (e.g., the set speed may be plus-or-minus X MPH relative to a speed limit and the controller 140 adjusts the cruise control set speed based on look ahead information relating to speed limits for the route). Additionally, the cooperative adaptive cruise control circuit 230 is structured to determine one or more CACC states such as a following distance, a vehicle speed, or a vehicle weight. In some embodiments, the CACC states may be determined using sensors. For example, the speed of the vehicle may be determined using a motion sensor and the weight of the vehicle may be determined using a weighing sensor. The cooperative adaptive cruise control circuit 235 may communicate the CACC states to the gear shifting management system 240. As will be explained with more details below, the gear shifting management system 240 may use the CACC states to prevent, skip, and/or manage transmission gear shift events.

The gear shifting management circuit 240 is structured to predict and prevent gear shift events within the vehicle 100. The gear shifting management circuit 240 may be configured to determine if a CACC operation mode is enabled in the vehicle 100 (e.g., based on button being pressed, a lever/switch actuated, and/or any other type of command to implement CACC with the vehicle that is received by the controller 140). If a CACC operation mode is enabled in the vehicle 100, the gear shifting management circuit 240 may update the transmission map (e.g., replace the previously-stored conventional transmission shift schedule with an updated map/shift schedule used with the CACC operating mode). The updated map may be stored in the controller 140 and retrieved when the CACC operating mode is enabled. Alternatively, the controller 140 may communicate to the remote computing system to receive an updated map or schedule when the CACC operating mode is enabled. For example, the controller 140 may communicate a transmission map identifier to the remote computing system 171 over the network 51. The remote computing system 171 may then match the transmission map identifier to a map stored in the transmission map(s) database 172 and then communicate the updated transmission map that matches the transmission map identifier over the network 51 to the controller 140. The "identifier" may refer to an identifier (a numeric, alphanumeric, alpha, etc.) that identifies the controller 140, transmission, and/or vehicle to the remote computing system for retrieving an updated map. Further, the identifier may include information regarding the route to obtain a transmission shift schedule specific to that route. As defined above, the CACC transmission map has less gear shift sensitivity when the vehicle 100 is operating at higher speeds and therefore at higher gears. In other embodiments, the gear shifting management circuit 240 may be structured to analyze look ahead information (e.g., road grade data, traffic data, etc.) obtained from the look ahead circuit 230 and one or more CACC vehicle states obtained from the cooperative adaptive cruise control circuit 235 to predict an unnecessary gear shift event and command that vehicle remains in its current gear in order to avoid the unnecessary gear shift event. In other embodiments, the gear shifting management circuit 240 may be structured to calibrate the predictive gear shifting circuit 242 based on one or more CACC vehicle states. In this regard, "calibration" refers to the updating of the transmission map(s) to make them standard/acceptable for certain conditions. An optimization goal of the calibration may be to reduce transmission shift events such that the maps are adjusted to change the shift points that would normally occur on certain conditions (e.g., uphill/downhill, etc.) to then reduce or skip those would-be shift events. Moreover and thus, the transmission maps used by the predictive gear shifting circuit 242 may be calibrated based on the weight of the vehicle 100, dynamic information regarding operation of the vehicle 100 (e.g., weather conditions), and/or the state of one or more vehicular system within the vehicle 100. For example, if the vehicle 100 is a semi-truck carrying a full load (e.g., weighing 50,000 pounds, 40,000 pounds, etc.), the transmission maps used by the predictive gear shifting circuit 242 may be calibrated to account for carrying the full load. As another example, if the vehicle 100 is traveling during icy weather conditions (e.g., sleet, snow, hail, etc.), the transmission maps used by the predictive gear shifting circuit 242 may be calibrated to account for the icy weather conditions. Then, the gear shifting management circuit 240 may then override any unnecessary gear shifts once calibrated with the CACC vehicle states.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication). In some embodiments, out-of-vehicle communications may be provided via the telematics unit 145 such that the communications interface may be incapable of out-of-vehicle communications.

The communications interface 216 may facilitate communication between and among the controller 150 and one or more components of the vehicle 100 (e.g., the engine 101, the transmission 102, the aftertreatment system 120, the sensors etc.). Communication between and among the controller 150 and the components of the vehicle 100 may be via any number of wired or wireless connections (e.g., any standard under IEEE). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Figure 3:
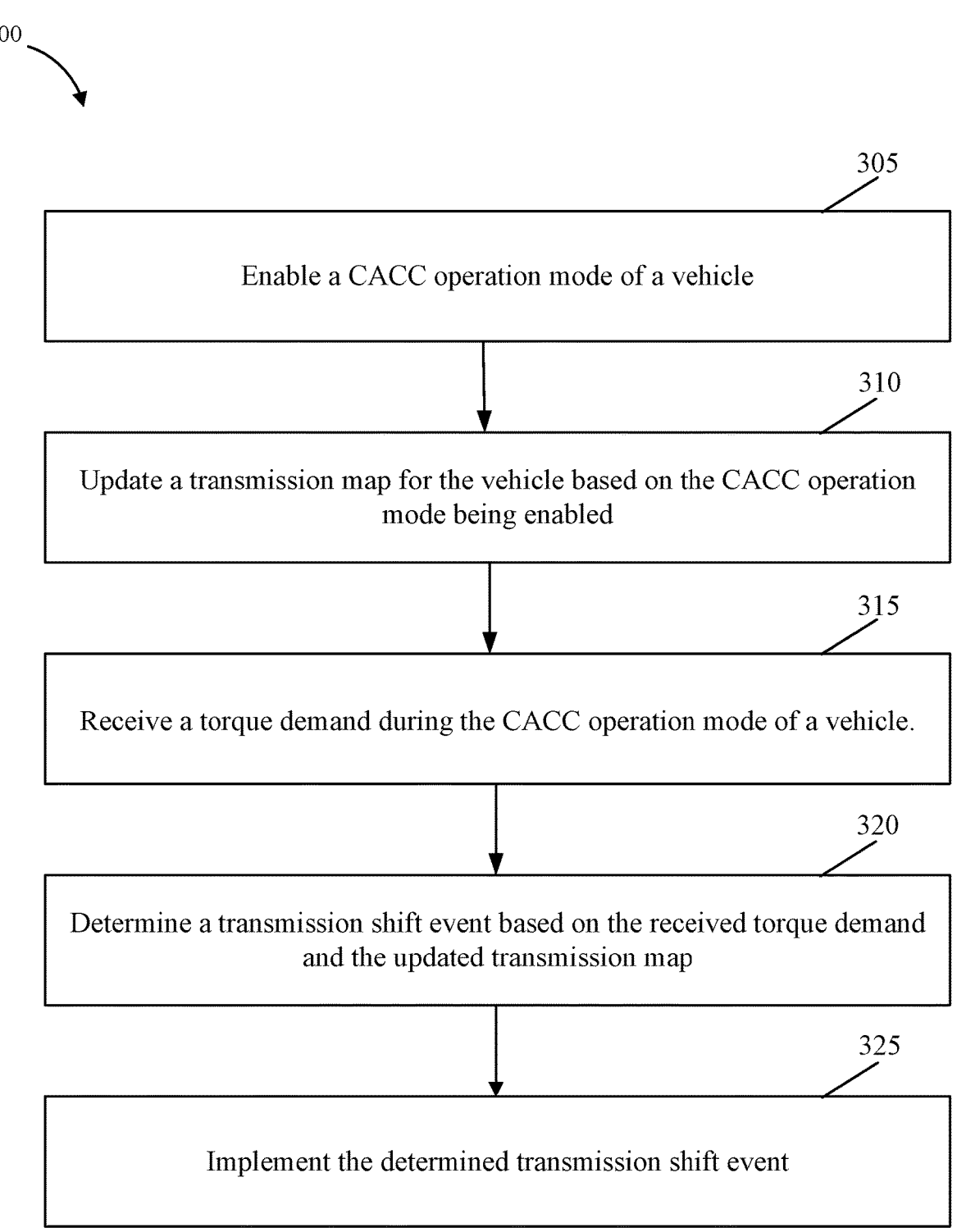
FIG. 3 is a flow diagram of a method of implementing a gear shifting control strategy with the vehicle 100 of FIG. 1, according to an exemplary embodiment.

Referring now to FIG. 3, a method 300 of operating the vehicle 100 with the controller 140 is shown, according to an example embodiment. In some embodiments, the method 300 may minimize the amount of unnecessary gear shift events during a CACC operation mode of a vehicle. In some embodiments, the method 300 may be used in conjunction with the methods 400 and 500 to minimize or reduce the amount of unnecessary gear shift events during a CACC operation mode a vehicle. In other embodiments, the method 300 may be used alone to minimize the amount of unnecessary gear shift events during CACC operation of a vehicle.

The method 300 begins at process 305 with the controller 140 enabling a CACC operation mode of the vehicle 100. The CACC operation mode of the vehicle is enabled when the vehicle receives a cruise control set speed and/or separation distance relative to another vehicle. In some embodiments, the cruise control set speed may be received by the vehicle from a user through an input device on the vehicle (e.g., buttons, touchscreen, microphone, etc.). In other embodiments, the cruise control set speed may be received by the vehicle based on information received from an external information source (e.g., remote computing system 171). For example, if the vehicle 100 receives look-ahead information that the vehicle 100 will be entering a highway, CACC operation mode may be prompted to a user (e.g., via a touchscreen or other display device in the vehicle) for enablement. In yet another embodiment, the cruise control set speed may be received by the vehicle from a user remote to the vehicle 100 (e.g., in an autonomous vehicle operation mode). For example, if the vehicle 100 is traveling as part of a platoon or fleet, a platoon manager may set a cruise control set speed for all the vehicles in the platoon. As described above, when the CACC operation mode is enabled with the vehicle 100, the speed of vehicle 100 is controlled without or substantially without a user having to keep an accelerator pedal depressed. More specifically, the controller 140 automatically controls the speed of a vehicle 100 to maintain a certain cruise control set speed and/or a certain predefined following distance relative (e.g., behind) to another vehicle. The position of the vehicle 100 relative to another vehicle may be determined based on sensor information from vehicle sensors (e.g., hall effect sensors, proximity sensors, etc.). Additionally, the vehicle 100 may communicate with one or more other vehicles (e.g., within its platoon, the lead vehicle, etc.) during the CACC operation mode of the vehicle. The remote conditions of the vehicle's route may be determined based on look ahead information.

Once the CACC operation mode has been enabled within the vehicle 100, the method 300 proceeds to process 310. At process 310, the controller 140, in conjunction with the TCU 160, updates or modifies a transmission map based on the CACC operation being enabled. More specifically, when a CACC operation mode has been enabled in the vehicle 100, the gear shifting system 160 may update the transmission map used by the vehicle 100 to be the CACC transmission map in order to reduce gear shift events. For example, the controller 140 may communicate a transmission map identifier to the remote computing system 171 over the network 51. The remote computing system 171 may then match the transmission map identifier to a map stored in the transmission map(s) database 172 and then communicate the updated transmission map that matches the transmission map identifier over the network 51 to the controller 140. In another embodiment, the existing transmission map may be modified based on previous experiences to mitigate or reduce transmission shift events for certain operating conditions (e.g., calibrated for these conditions). In this instance, this modified map may be retrieved from the memory of the controller 140 for usage.

At process 315, the controller 140 receives a torque demand (e.g., from an accelerator pedal of the vehicle) during the CACC operation mode of the vehicle. A torque demand may be defined as the amount of torque necessary for an engine to meet a certain desired speed (e.g., based on the cruise control set speed). In some embodiments, a vehicle may shift one or more gears in order to meet an engine torque demand. As explained above, during conventional vehicle operation, a conventional transmission map may have increased sensitivity to torque demands made by the vehicle when changing speed. But when the CACC operation mode is enabled within the vehicle 100, this increased sensitivity may be undesired.

At process 320, the controller 140 determines a transmission shift event based on the torque demand received at process 315 and the updated transmission map determined at process 310. A transmission shift event may be a gear downshift (e.g., moving the gear from a current gear to a lower gear, such as $7^{th}$ to $6^{th}$), a gear upshift (e.g., moving the gear from a current gear to a higher gear, such as $5^{th}$ to $6^{th}$), or maintaining a gear in its current position. A goal of the method 300 at process 320 is to minimize at least one of an amount of upshifts and downshifts and maintain a current transmission setting or gear as much as possible. The updated transmission shift map determined at process 310 allows the controller 140 to avoid potentially unnecessary gear shift events (e.g., upshifts and downshifts) and maintain the gear in its current position as much as possible. Take for example a scenario in which the vehicle 100 is traveling behind a lead vehicle as part of a platoon. As described above, the CACC system 155 may enable the vehicle 100 and the lead vehicle to coordinate their driving (e.g., similar acceleration, braking, etc.) in order to maintain a certain following distance and similar operations (e.g., braking at similar times, accelerating at similar times, etc.) due to the communicable coupling between the vehicles. During operation, the lead vehicle may determine a transient need for a braking event (e.g., to accommodate traffic crossing an intersection). Though this braking event was only temporary and only slightly changed the speed of the vehicle, the transmission may still shift gears of the vehicle 100 to meet the torque demand created by the braking event if operating according to a conventional transmission map. However, since the controller 140 updated the transmission map at process 310 to have decreased sensitivity to torque demands (e.g., a CACC transmission map), then the controller 140 determines a transmission shift event of maintaining the current gear position at process 320 (i.e., a non-shift event).

At process 325, the controller 140 controls the operation of one or more vehicle systems or components in order to implement the transmission shift event determined at process 325. More specifically, in one embodiment, the TCU 160 may modify the transmission settings to implement a gear shift in the transmission 135 based on a command from the controller 140. In another embodiment, the controller 140 controls the transmission directly. In some embodiments, the controller may maintain a current gear position for the vehicle 100. In other embodiments, the controller 140 may upshift or downshift the gear position for the vehicle 100. Then the method 300 ends at process 325.

Referring now to FIG. 4, a method 400 of operating the vehicle 100 with the controller 140 is shown, according to an example embodiment. In some embodiments, the method 400 may be used to minimize or reduce the amount of gear shift events during a CACC operation mode of a vehicle. In some embodiments, the method 400 may be used in conjunction with the methods 300 and 500 to minimize the amount of unnecessary gear shift events during a CACC operation mode a vehicle. In other embodiments, the method 400 may be alone to minimize the amount of unnecessary gear shift events during CACC operation of a vehicle.

The method 400 begins at process 405 with the controller 140 enabling a CACC operation mode of the vehicle 100. As described above, the CACC operation mode is enabled with the vehicle 100 when the cruise control set speed is received by the vehicle. In some embodiments, the cruise control set speed may be received by the vehicle from a user through an input device on the vehicle (e.g., buttons, touchscreen, microphone, etc.). In other embodiments, the cruise control set speed may be received by the vehicle based on information received from an external information source (e.g., remote computing system 171). For example, if the vehicle 100 receives look-ahead information that the vehicle 100 will be entering a highway, CACC operation mode may be prompted to the user for enablement. In yet another embodiment, the cruise control set speed may be received by the vehicle from a user remote to the vehicle 100. For example, if the vehicle 100 is traveling as part of a platoon or fleet, a platoon manager may set a cruise control set speed for all or some of the vehicles in the platoon. When the speed of vehicle 100 is controlled without or substantially without a user having to keep an accelerator pedal depressed. More specifically, the controller 140 automatically controls the speed of a vehicle 100 to maintain a certain cruise control speed and a certain following distance behind another vehicle. Additionally, the vehicle 100 may communicate with one or more other vehicles within its platoon during the CACC operation mode of the vehicle.

Once the CACC operation mode has been enabled within the vehicle 100, the method 400 proceeds to process 410. At process 410, the controller 140 determines one or more CACC vehicle states for the vehicle 100. The one or more CACC vehicle states may include, but are not limited to, a certain following distance, a vehicle speed, a vehicle proximity to other vehicle's and objects, and/or a vehicle weight. For example, the controller 140 may determine a following distance between the vehicle 100 and a lead vehicle in front of the controller 140. Additionally, the controller 140 may determine a vehicle speed necessary for the vehicle to maintain the certain following distance and/or the set cruise control speed.

Then the method 400 proceeds to process 415. At process 415, the controller 140 predicts a vehicle gear shift based on look ahead information after enabling the CACC operation mode of a vehicle. More specifically, the controller 140 may receive look-ahead information and determine future portions of the vehicle's route that may lead to a gear shift event. For example, if the look ahead information shows a change in road grade, traffic, or weather, the controller 140 may predict that these changes may trigger gear shift events in the vehicle 100. This may be based on prior operational data of the vehicle itself operating in similar conditions and/or experimental data for a similar vehicle. Look ahead information may include, but is not limited to, traffic information, weather conditions, road grade conditions, speed limits, vehicle proximity distance to other vehicles, and any other information ahead of the vehicle that may impact or affect vehicle operation. More specifically, the controller 140, analyzes look ahead information (e.g., road grade data, traffic data, etc.) obtained by the controller 140 to predict a vehicle gear shift event. For example, the controller 140 may determine that the vehicle 100 is approaching a downhill portion of its route. During the downhill portion of the vehicle's route, the CACC system 155 may request a slight deceleration in the vehicle for a short period of time in order to maintain a certain following distance behind another vehicle. This slight deceleration may lead to a temporary engine braking which may cause an unnecessary vehicle gear down shift given that the engine braking is only temporary. Given the slight deceleration request made by the CACC system 155, the controller 140 may predict that an unnecessary gear shift event may occur during the downhill portion of the vehicle's route at process 410.

As another example, the controller 140 may determine that the vehicle 100 is approaching an uphill portion of its route. Depending on the length and/or grade of the uphill portion, the vehicle 100 may require more torque to traverse the uphill. For example, a longer or steeper uphill portion may require more torque to traverse than a shorter or flatter uphill. During the shorter and/or gentler uphill portion of the vehicle's route (e.g., less than 100 feet with a 6% grade), the vehicle 100 may request less torque to traverse the uphill. Given the slight increase in torque requested by the vehicle, the controller 140 may determine that the increase in torque may cause an unnecessary vehicle gear down shift event given that this uphill portion is relatively shorter and/or gentler. During a longer and/or steeper uphill portion, the controller 140 may determine that the vehicle needs more momentum to traverse that uphill portion. The vehicle may obtain more momentum by increasing the speed of vehicle (e.g., increasing the cruise control set speed). In this case, the controller 140 may determine that the vehicle 100 may increase its momentum while maintaining the current gear of the vehicle.

As a final example, the controller 140 may determine that a vehicle 100 is approaching an intersection during a flat portion of the vehicle's route. The controller 140 may receive brake information from a lead vehicle which indicates a potential shift event. Typically, this braking may lead to a predicted vehicle gear shift event as the vehicle approaches the intersection. However, using look ahead information, the controller 140 may determine a type of intersection the vehicle 100 is approaching and predict a gear shift even based on the type of intersection. For example, if the vehicle 100 is approaching a four way intersection without a stop sign and even though a brake indication from a lead vehicle is received, the controller 140 may predict that a gear down shift event is unnecessary because traversal of the intersection is momentary or transient (i.e., the brake event associated with the braking information from the lead vehicle is expected to last less than a predefined amount of time that indicates a transient event and the vehicle maintains the current transmission instead due to this indication).

At process 420, the controller 140 determines if the vehicle can avoid the predicted vehicle gear shift event based on one or more CACC vehicle states and/or other information. More specifically, the controller 140 may analyze the CACC vehicle states determined at process 410 to determine whether the controller 140 may maintain the gear of vehicle 100 in its current position to avoid the vehicle gear shift event. For example, if the vehicle's following distance is more than a predefined amount (e.g., more than 100 feet) and/or the vehicle is moving at or within a predefined amount of a speed (e.g., the cruise control set speed), then the controller 140 may command the vehicle stays in its current gear in order to avoid the unnecessary gear shift event. Then the method 400 proceeds to process 425.

At process 425, the controller 140 determines a transmission shift event based on the determination that the vehicle can avoid the predicted vehicle gear shift events. A transmission shift event may be a gear down shift (e.g., moving to a relatively lower gear from a current gear/setting), a gear up shift event (e.g., moving to a relatively higher gear/setting from a current gear/setting), or maintaining a gear in its current position. A goal of the method 400 at process 425 is to minimize or avoid the predicted vehicle gear shift event. For example, the controller 140 may determine a transmission shift event of maintaining the transmission gear/setting of vehicle 100 in its current position based on the controller 140 determining that one or more of the CACC vehicle states indicate that the vehicle 100 can maintain a certain following distance while in its current gear. More specifically, the controller 14 may determine a following distance between the vehicle 100 and a vehicle adjacent (e.g., behind or ahead of vehicle 100) based on information from one or more sensors on the vehicle (or from information from nearby vehicles) and then determine if the following distance is above or below a predetermined threshold. If the following distance is above the predetermined threshold, the controller 140 may command the transmission may remain in its current gear.

At process 430, the controller 140 controls the operation of one or more vehicle systems in order to implement the transmission shift event determined at process 430. For example, the controller 140 may communicate a transmission setting to the TCU 160 which may implement the transmission setting in the transmission 135. Implementing the transmission setting may include downshifting the gear, upshifting the gear, or keeping the gear in its current setting. In some embodiments, the controller may maintain a current gear position for the vehicle 100. In other embodiments, the controller 140 may upshift or downshift the gear position for the vehicle 100. Then the method 400 ends at process 430.

Referring now to FIG. 5, a method 500 of operating the vehicle 100 with the controller 140 is shown, according to an example embodiment. In some embodiments, the method 500 may be used to minimize the amount of gear shift events during the autonomous operation of the vehicle 100 while the CACC operation mode of a vehicle is enabled. In some embodiments, the method 500 may be used in conjunction with the methods 300 and 400 to minimize the amount of unnecessary gear shift events during a CACC operation mode a vehicle. In other embodiments, the method 500 may be alone to minimize the amount of unnecessary gear shift events during CACC operation of a vehicle.

The method 500 begins at process 505 with the controller 140 determining and enabling an autonomous driving level for the vehicle 100. As mentioned above, the vehicle 100 implementing the CACC system 155 and improved gear shifting management may be an automated (e.g., at least partly self-driving) vehicle. The vehicle may include varying levels of automation ranging from partially automated (e.g., cruise control being enabled) to fully enabled (e.g., vehicle completely drives itself). In some embodiments, the controller 140 determines an automation driving level for the vehicle based on some input received from the user. For example, the user may enter through an input device associated with the vehicle (e.g., keyboard screen, microphone, button, etc.) a desired driving level. In other embodiments, the controller 140 may automatically determine the autonomous driving level for the vehicle 100 based on the condition of the vehicle and the driver. For example, if a user becomes unresponsive, the controller 140 may determine a fully autonomous driving level for the vehicle. Once the autonomous driving level has been determined, the controller 140 enables the determined autonomous driving level within the vehicle 100. In this example, the vehicle is operating in a full autonomous mode of operation. The method then proceeds to process 510

At process 510, the controller 140 enables a CACC operation mode of the vehicle 100. As described above, when the CACC operation mode is enabled with the vehicle 100, the speed of vehicle 100 is controlled without or substantially without a user having to keep an accelerator pedal depressed. More specifically, the controller 140 automatically controls the speed of a vehicle 100 to maintain a certain cruise control speed and a certain following distance behind another vehicle. Additionally, the vehicle 100 may communicate with one or more other vehicles within its platoon (or other vehicles) during the CACC operation mode of the vehicle. Thus, in this example, the vehicle is operating in an autonomous mode of operation and in a CACC operating mode.

Once the CACC operation mode has been enabled within the vehicle 100, the method 500 proceeds to process 515. At process 515, the controller 140 determines one or more CACC vehicle states for the vehicle 100. The one or more CACC vehicle states may include, but are not limited to, a certain following distance, a vehicle speed, and/or a vehicle weight. For example, the controller 140 may determine a following distance between the vehicle 100 and a leader vehicle in front of the controller 140. Additionally, the controller 140 may determine a vehicle speed necessary for the vehicle to maintain the certain following distance.

Then the method 500 proceeds to process 520. At process 520, the controller 140 updates the predictive gear shifting circuit 242 based on the CACC vehicle states determined at process 515. As defined above, the predictive gear shifting circuit 242 uses look ahead information to predict a future gear shift of the vehicle and, in some embodiments, implements that predicted or determined gear shift early in order to increase vehicle performance and/or fuel economy savings. In some embodiments, the predictive gear shifting circuit 242 may be configured to minimize the unnecessary gear shift events by updating the predictive gear shifting circuit 242 based on the one or more CACC vehicle states (e.g., a following distance, a vehicle speed, and a vehicle weight). Then the method proceeds to process 525.

At process 525, the controller 140 determines a transmission shift event based on the updated predictive gear shifting circuit 242. As described above, transmission shift event may be a gear down shift (e.g., moving the gear from a higher gear to a lower gear), a gear up shift (e.g., moving the gear from a lower gear to a higher gear), or maintaining a gear in its current position. The goal of the method 500 at process 525 is to minimize or avoid unnecessary gear shift events. For example, at process 525, the controller 140 may determine a transmission shift event of maintaining the vehicle 100's gear in its current position based on the updated predictive gear shifting circuit 242.

At process 530, the controller 140 controls the operation of one or more vehicle systems in order to implement the transmission shift event determined at process 530. In some embodiments, the controller may maintain a current gear position for the vehicle 100. In other embodiments, the controller 140 may upshift or downshift the gear position for the vehicle 100. Then the method 500 ends at process 530.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the look ahead circuit 230, the coasting prediction circuit 235, and the engine control circuit 240 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium storing instructions for execution by various types of processors, such as the processor 215 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods may be accomplished with standard programming techniques with rule-based logic and other logic to accomplish the various connection steps, processing steps, comparison steps, and decision steps.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A method comprising:
enabling a cooperative adaptive cruise control (CACC) mode of a vehicle;
in response to enabling the CACC mode of the vehicle, updating a transmission shift map to adjust at least one threshold associated with a transmission shift event;
in response to enabling the CACC mode of the vehicle, receiving a torque demand from the vehicle;
determining the transmission shift event based on the received torque demand and the updated transmission shift map; and
implementing the determined transmission shift event.

2. The method of claim 1, wherein the vehicle is one vehicle in a platoon of vehicles comprising a plurality of vehicles utilizing CACC.

3. The method of claim 2, wherein the platoon of vehicles comprises a lead vehicle configured to provide route information to one or more trail vehicles within the platoon of vehicles.

4. The method of claim 1, wherein the updated transmission shift map increases at least one engine speed threshold for at least one transmission setting such that the updated transmission shift map has less gear shift sensitivity at higher gears.

5. The method of claim 1, wherein implementing the determined transmission shift event comprises bypassing the determined transmission shift event to maintain a current transmission setting.

6. A method comprising:
enabling a cooperative adaptive cruise control (CACC) mode of a vehicle;
determining one or more CACC vehicle states;
in response to enabling the CACC mode of the vehicle, predicting a vehicle gear down shift event based on look ahead information;
determining that the vehicle can avoid the predicted vehicle gear down shift event based on the one or more CACC vehicle states;
determining a transmission shift event based on the determination that the vehicle can avoid the predicted vehicle gear down shift event; and
implementing the determined transmission shift event.

7. The method of claim 6, wherein the look ahead information indicates that the predicted vehicle gear down shift event is during an upcoming downhill operating condition for the vehicle.

8. The method of claim 6, wherein the look ahead information indicates an upcoming road grade above a predefined value indicative of an uphill operating condition that is less than a predefined distance, the method further comprising:
predicting another down shift event based on the look ahead information indicating that the upcoming road grade is above the predefined value; and
maintaining a current transmission setting based on the look ahead information indicating that the uphill operating condition is less than the predefined distance.

9. The method of claim 8, further comprising:

receiving braking information from a lead vehicle ahead of the vehicle indicative of a potential shift event;

predicting a vehicle shift event based on the received braking information; and maintaining the current transmission setting based on the look ahead information indicating that a brake event associated with the braking information is expected to last less than a predefined amount of time.

10. The method of claim 6, wherein the one or more CACC vehicle states includes at least one of a following distance, a vehicle speed, or a vehicle weight.

11. The method of claim 10, wherein the CACC vehicle state includes the following distance relative to a lead vehicle, wherein the determined transmission shift event is maintaining a current transmission setting based on the following distance meeting or exceeding a predefined following distance amount.

12. The method of claim 6, wherein the vehicle is one vehicle in a platoon of vehicles comprising a plurality of vehicles utilizing CACC.

13. A system, comprising:

a controller coupled to a powertrain of a vehicle, the controller configured to:

enable a cooperative adaptive cruise control (CACC) mode of the vehicle;

in response to enabling the CACC mode of the vehicle, update a transmission shift map to adjust at least one threshold associated with a transmission shift event;

in response to enabling the CACC mode of the vehicle, receive a torque demand from the vehicle;

determine the transmission shift event based on the received torque demand and the updated transmission shift map; and implement the determined transmission shift event.

14. The system of claim 13, wherein the vehicle is one vehicle in a platoon of vehicles comprising a plurality of vehicles utilizing CACC, wherein the platoon of vehicles comprises a lead vehicle, and wherein the controller is configured to receive information from the lead vehicle.

15. The system of claim 13, wherein the updated transmission shift map increases at least one engine speed threshold for at least one transmission setting such that the updated transmission shift map has less gear shift sensitivity at higher gears.

16. The system of claim 13, wherein the controller is further configured to:

in response to enabling the CACC mode of the vehicle, determine one or more CACC vehicle states;

predict a vehicle gear down shift event based on look ahead information; and determine that the vehicle can avoid the predicted vehicle gear down shift event based on the one or more CACC vehicle states.

17. The system of claim 16, wherein the look ahead information indicates that the predicted vehicle gear down shift event is during a downhill operating condition.

18. The system of claim 16, wherein the look ahead information indicates that the predicted vehicle gear down shift event is during an uphill operating condition.

19. The system of claim 18, wherein implementing the determined transmission shift event comprises shifting or causing a shift to a higher gear setting relative to a current setting in advance of the uphill operating condition.

20. The system of claim 13, wherein the controller is further configured to:

receive look ahead information indicative of an upcoming intersection associated with a braking event;

predict a down shift event based on the look ahead information indicating that the intersection is associated with the braking event; and maintain a current transmission setting based on the look ahead information indicating that the braking event is less than a predetermined period of time.

* * * * *